United States Patent [19]
Adkins, II et al.

[11] Patent Number: 5,838,776
[45] Date of Patent: Nov. 17, 1998

[54] POWER CONTROLLER FOR A HEATING/AIR CONDITIONING UNIT

[76] Inventors: James E. Adkins, II, 140-D South Dr., South Point, Ohio 45680; Kenneth W. Winters, P.O. Box 728, Maynardville, Tenn. 37807

[21] Appl. No.: 701,920

[22] Filed: Aug. 23, 1996

[51] Int. Cl.[6] .................................................. H04M 11/00
[52] U.S. Cl. .............................. 379/102.05; 379/102.04; 307/39; 361/96
[58] Field of Search ........................ 379/102.01, 102.02, 379/102.04, 102.05, 102.07, 106.01, 39, 40, 42, 43; 219/483, 486, 490; 307/38, 39; 361/54–57, 59, 60, 62, 63, 65, 88–90, 92–95

[56] References Cited

U.S. PATENT DOCUMENTS

| | | |
|---|---|---|
| 3,937,978 | 2/1976 | Owenby, Jr. . |
| 4,034,570 | 7/1977 | Anderson et al. . |
| 4,168,491 | 9/1979 | Phillips et al. .............................. 307/39 |
| 4,288,990 | 9/1981 | Schulz . |
| 4,318,508 | 3/1982 | Glasgow et al. . |
| 4,431,134 | 2/1984 | Hendricks et al. . |
| 4,446,359 | 5/1984 | Arribas et al. .............................. 307/39 |
| 4,730,941 | 3/1988 | Levine et al. . |
| 4,827,369 | 5/1989 | Saletta et al. .............................. 361/96 |
| 4,847,892 | 7/1989 | Shelley . |
| 4,948,040 | 8/1990 | Kobayashi et al. . |
| 5,061,916 | 10/1991 | French et al. . |
| 5,159,534 | 10/1992 | Hudson et al. . |
| 5,200,987 | 4/1993 | Gray . |
| 5,326,027 | 7/1994 | Sulfstede . |
| 5,377,497 | 1/1995 | Powell . |
| 5,477,913 | 12/1995 | Polk et al. . |
| 5,505,377 | 4/1996 | Weiss . |
| 5,522,044 | 5/1996 | Pascucci et al. . |
| 5,581,132 | 12/1996 | Chadwick ................................. 361/62 |
| 5,625,236 | 4/1997 | Lefebvre ................................... 307/38 |

*Primary Examiner*—Wing F. Chan
*Attorney, Agent, or Firm*—Cushman Darby & Cushman IP Group of Pillsbury Madison & Sutro LLP

[57] ABSTRACT

A power controller for a powered device such as a heating/air conditioning unit that monitors and controls the supply of power to an individual heating/air conditioning unit and shuts off power to the powered device when the voltage level of the power supplied to the unit falls outside a predetermined range. The power controller also transmits telephonic alarms and receives touch tone commands over telephone lines. The power controller may be equipped with a device for sensing the presence of a fire.

81 Claims, 4 Drawing Sheets

POWER CONTROLLER FOR A HEATING/ AIR CONDITIONING UNIT

The present invention relates generally to a power controller for a powered device such as a heating/air conditioning unit, and more particularly to a power controller that controls the power supplied to an individual heating/air conditioning unit and communicates with a remote location via telephone lines.

BACKGROUND ART

Many hotels, motels, hospitals and the like have rooms outfitted with individual heating/air conditioning units. At times, such as during storms and brown-outs, the voltage level of power supplied to an unprotected unit drops. Such drops in power can damage the unit's compressor motor.

In order to protect heating/air conditioning units from drops in power, devices to control the power supplied to the units were developed. For example, U.S. Pat. No. 5,377,497 to Powell discloses a timed-off control apparatus for an air conditioner. The device will shut off power delivered to the air conditioner for a predetermined time period when power is disrupted. This device, however, is unable to provide any information to a remote location, such as a hotel front desk, as to what is occurring with the unit.

Systems have also been developed which have alarm reporting capability, such as those disclosed in U.S. Pat. Nos. 3,937,978 to Owenby and 5,061,916 to French et al. These systems, however, do not separately monitor and control power supplied to an individual heating/air conditioning unit. Instead, they monitor and control power feed lines that feed entire buildings, floors or wings. Because the voltage level of power delivered to individual units fed by the same power feed line may vary, a unit could become damaged even if the power feed line is protected. Furthermore, such systems required extensive additional wiring within the building to provide avenues for the reporting of alarms to a remote location.

SUMMARY OF THE INVENTION

The present invention solves the problems not addressed by the prior art by providing a power controller for an individual heating/air conditioning unit which monitors the power supplied to the unit and cuts off power to the unit in the event that the voltage level of power supplied to the unit drops below a threshold level which might be harmful to the unit's compressor motor. The power controller is equipped with a telephone receptacle which is capable of receiving a telephone cable. The controller is capable of communicating alarms to a remote location via the transmission of tones or beeps over preexisting telephone lines. The controller is also capable of receiving and responding to commands issued from any touch tone telephone. Through the commands, the invention is also able to turn on and off power so as to save energy when a room having a power controller according to the present invention is unoccupied.

The present invention is not limited to use with heating/air conditioning units, but may be used to protect any powered device having a motor, compressor or pump, such as certain industrial machinery, refrigeration equipment, freezers, etc. It is equally important that such devices not operate under a load without adequate power.

An object of the present invention is to provide a power controller that monitors the power supplied to a device such as an individual heating/air conditioning unit and shuts off power to the unit if the voltage level of the power supplied to the unit drops below a level that may damage the unit's compressor motor.

A further object of the present invention is to provide a power controller that will transmit alarm codes to a remote location.

A further object of the present invention is to provide a power controller capable of communicating with a remote location over existing telephone lines.

A further object of the present invention is to provide a power controller capable of sensing the presence of a fire and reporting a fire alarm to a remote location.

A yet further object of the present invention is to provide a power controller that can be controlled from a remote location by placing a touch tone phone call to the controller and entering commands via the telephone keypad.

A further object of the present invention is to provide security measures by which a power controller cannot be controlled via a touch tone phone without first entering the proper security code.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which.

DETAILED DESCRIPTION OF THE PRESENTLY PREFERRED EXEMPLARY EMBODIMENTS

The present invention will be better understood by reference to the accompanying drawings.

Figure 1:
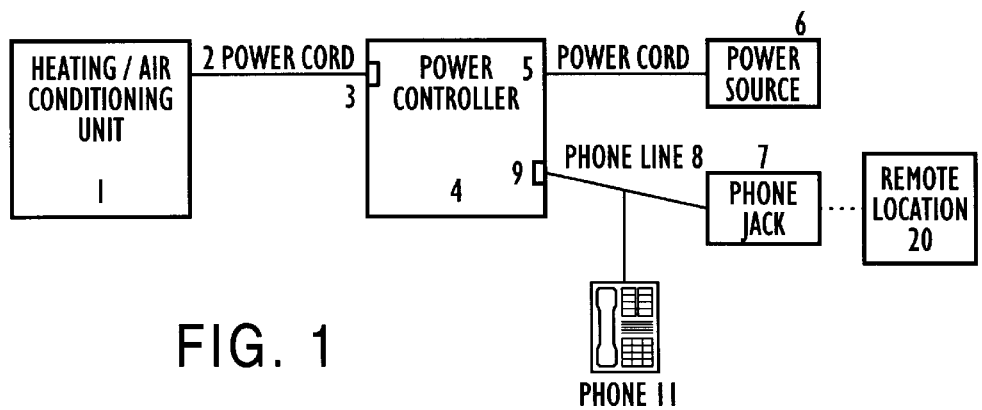
FIG. 1 is a block diagram of the power controller as used in accordance with an embodiment of the present invention.

FIG. 1 illustrates a power controller 4 provided with power receptacle 3, power cord 5 and telephone line-in jack 9. Power controller 4 is plugged into a 230 volt power source via power cord 5. Power receptacle 3 in turn receives power cord 2 of heating/air conditioning unit 1. It is to be understood that more than one power receptacle 3 may be provided by power controller 4. Furthermore, any source voltage can be accommodated. Power controller 4 is connected to phone jack 7 via phone line 8 through phone jack 9.

By interposing power controller 4 between power source 6 and heating/air conditioning unit 1, the power controller may shut off power to heating/air conditioning unit 1 during a brown-out or power outage for a predetermined delay time or until it receives a power-on command after the voltage level supplied by power source 6 returns to normal to prevent damage to the compressor motor (not shown) of heating/air conditioning unit 1.

By providing a phone jack 9 and phone line 8 connected to existing phone jack 7, power controller 4 is provided with a preexisting route by which it may communicate with remote location 20. By also attaching telephone 11 to phone line 8, preexisting telephone service may be maintained in a room utilizing power controller 4. Alternatively, a second telephone jack (not shown) can be provided in power controller 4 into which telephone 11 can be connected.

Note that power controller 4 is modular and can be plugged into any suitable outlet and can have any suitable appliance plugged into it. Also power controller 4 can use a preexisting communication route. Therefore, power controller 4 does not require that a building be rewired to provide either power or a communication path for the device. Thus, in a building containing many heating/air conditioning units, such as a hotel, the use of a power controller in accordance with this invention will dramatically reduce installation time and costs. However, it should be understood that the invention is also appropriate for new construction.

The use of the preexisting telephone lines enables power controller 4 to detect an incoming call and pick up the call after a predetermined ring count. A delay in picking up the line is preferred so that the power controller 4 does not pick up incoming calls meant for the room's occupant.

The telephone path enables power controller 4 to call a predetermined call-back number, such as a hotel front desk, and sound an alarm code, such as a tone, combination of tones, beep or series of beeps. Each possible alarm could be provided with a different tone, combination of tones or number of beeps.

When a caller calls the telephone number of power controller 4 and power controller 4 has picked up the call, the caller may issue commands to power controller 4 via a touch tone keypad (not shown). Each key on the keypad or combination of keys could be assigned a corresponding command. Such commands may include: disable power; enable power; set pick-up ring count; set new security code; set length of power-on delay; set new callback number; alarm acknowledge; and the like. Security measures may be provided which require the caller to enter an identification code prior to issuing commands to the power controller 4.

Figure 2:
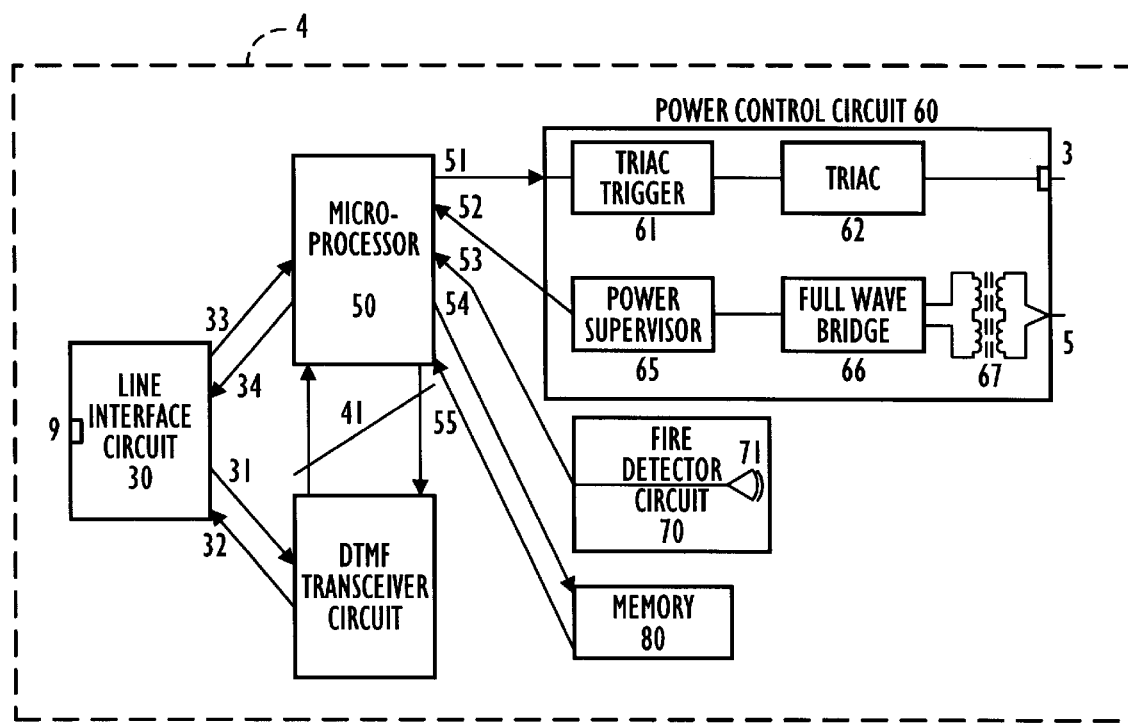
FIG. 2 is a block diagram of the major components of the power controller in accordance with an embodiment of the present invention.

Referring now to FIG. 2, power controller 4 contains line interface circuit 30 which interfaces with phone jack 9. Line interface circuit 30, for instance, may be of the type MH88400, or any other acceptable line interface. Line interface circuit 30 provides the proper interface terminations and loads required by a standard phone line.

The transmit and receive signals from line interface circuit 30 are connected to DTMF transceiver 40 over lines 31 and 32. DTMF transceiver 40 may be of the type MT8888C, or any other acceptable DTMF transceiver. It is to be understood that a separate transmitter and receiver may also be utilized. DTMF transceiver 40 is capable of generating tones of a standard interval that are compatible with autodialer and remote office applications. Tones that are transmitted to phone line 8 of FIG. 1 from power controller 4 are generated by DTMF transceiver 40. Tones that are received from phone line 8 of FIG. 1 by power controller 4 are received and interpreted by DTMF transceiver 40.

The ring and loop control signals from line interface circuit 30 are connected to microprocessor 50 via lines 33 and 34. Interface signals from DTMF transceiver are also connected to microprocessor 50 via lines 41. Microprocessor 50 may be of the type P87C52 or any other acceptable microprocessor. Memory 80 may be provided in which information such as the pick-up ring count, the power-on delay, the call-back number and security code may be stored.

The power is monitored in power control circuit 60 by stepping down the voltage supplied from power source 6 (FIG. 1) to power cord 5 through a transformer 67, a full wave bridge 66 and power supervisor 65. If a low voltage situation occurs, such as a brown-out, power supervisor 65 detects the low voltage situation and signals microprocessor 50 via line 52 until normal power is restored. Alternatively or concurrently, power supervisor 65 may detect excessive current. Microprocessor 50 then signals triac trigger 61 via line 51. Triac trigger 61 controls triac 62 which in turn removes the power supplied to power receptacle 3 and thus to the unit. The power can be turned off and held off for a preset delay time or until the power controller receives a power-on command from a remote location.

Fire detector circuit 70 may be supplied. Fire detector circuit 70 may contain a microphone 71 which, when provided with a smoke alarm audible signal, causes alarm circuit 70 to signal microprocessor 50 over line 53 that a fire is detected. Microprocessor 50, through lines 41, then causes DTMF transceiver 40 to initiate a phone call to the call-back number to report the alarm. It is to be understood that a microphone need not be used. Other known sensors may be used, such as chemical sensors and/or thermometers, to detect the presence of a fire. Furthermore, transceiver 40 can initiate a phone call to a special emergency number, such as the fire department.

Figure 3:
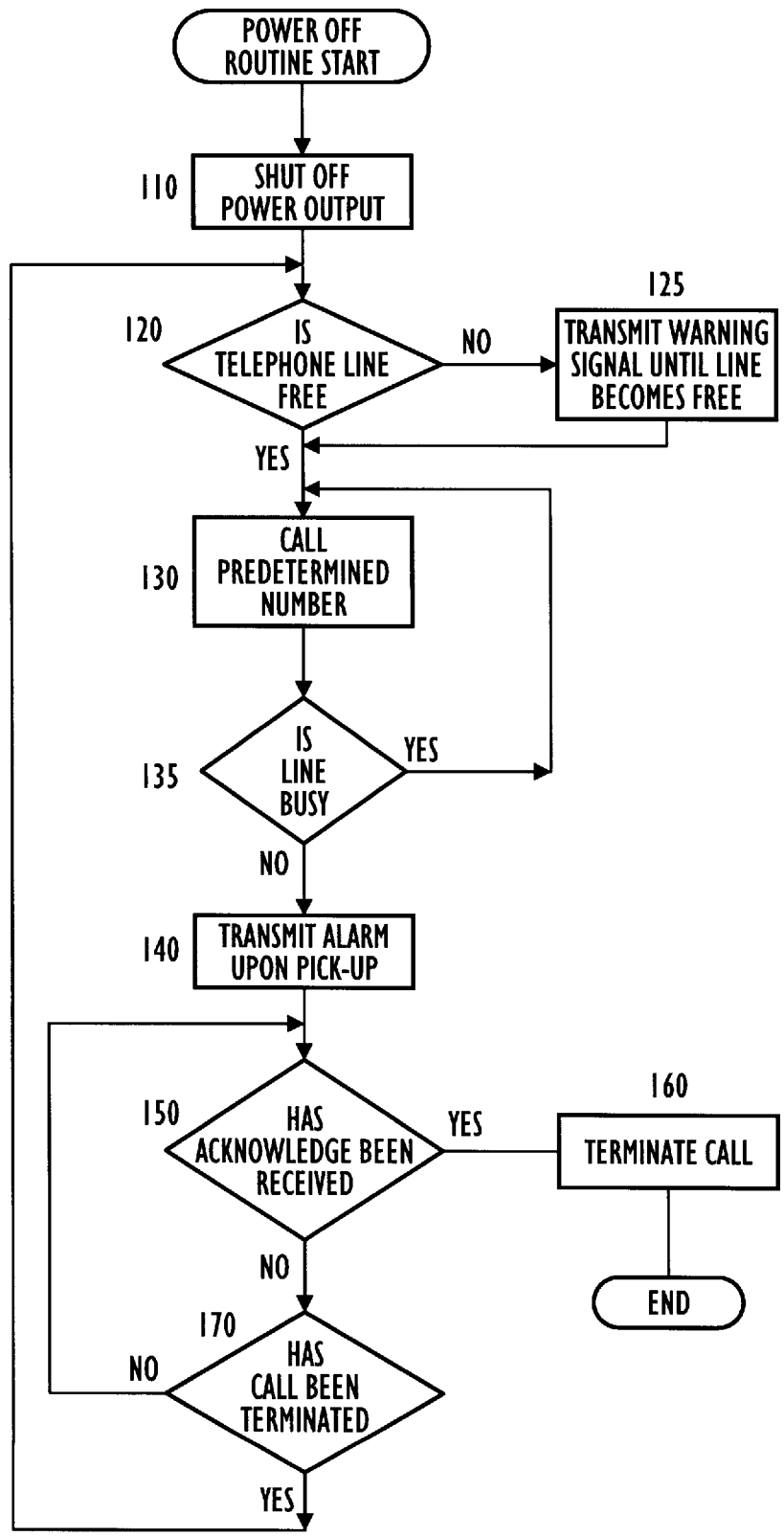
FIG. 3 is a flow chart of the power drop routine in accordance with an embodiment of the present invention.

The power controller constantly monitors the power supplied to it, the fire status and the incoming call status. Referring now to FIG. 3, the routine utilized by microprocessor 50 of power controller 4 when a drop in power is detected under an embodiment of the present invention will now be described. When power supervisor 65 sends a signal on line 52 to microprocessor 50 that the voltage level of the power has dropped below a predetermined level, microprocessor 50 first sends a signal on line 51 to triac trigger 61 to shut off the power output to the heating/air conditioning unit in stage 110 for a predetermined time period or until a power-on command is received. In stage 120, the power controller then determines if the telephone line is free. If the line is not free, the power controller will issue a warning signal over the phone line until the phone line becomes free in stage 125. In stage 130, the power controller then calls the predetermined telephone number of the remote location, such as a hotel front desk. If the line is busy, in stage 135 the controller will hang up and call again.

Once a phone connection is made to the call-back number, the controller will enter stage 140 and transmit the power-off alarm signal. The controller will continue to transmit the alarm signal until an alarm acknowledge signal is received or until the call is terminated. The alarm acknowledge signal is a signal to be sent by the person whom the controller called, such as a hotel front desk clerk. The signal may be a tone, a combination of tones or a number of beeps.

In stage 150, the power controller checks to see if it has received an alarm acknowledge signal. If it has received the alarm acknowledge signal, the power controller terminates the call in stage 160 and the routine ends.

If the power controller has not received an alarm acknowledge signal, in stage 170 it checks to see if the call has been terminated. If the call has not been terminated, the controller moves back to stage 150. If the call has been terminated, the power controller goes back to stage 120 and reinitiates the call.

Figure 4:
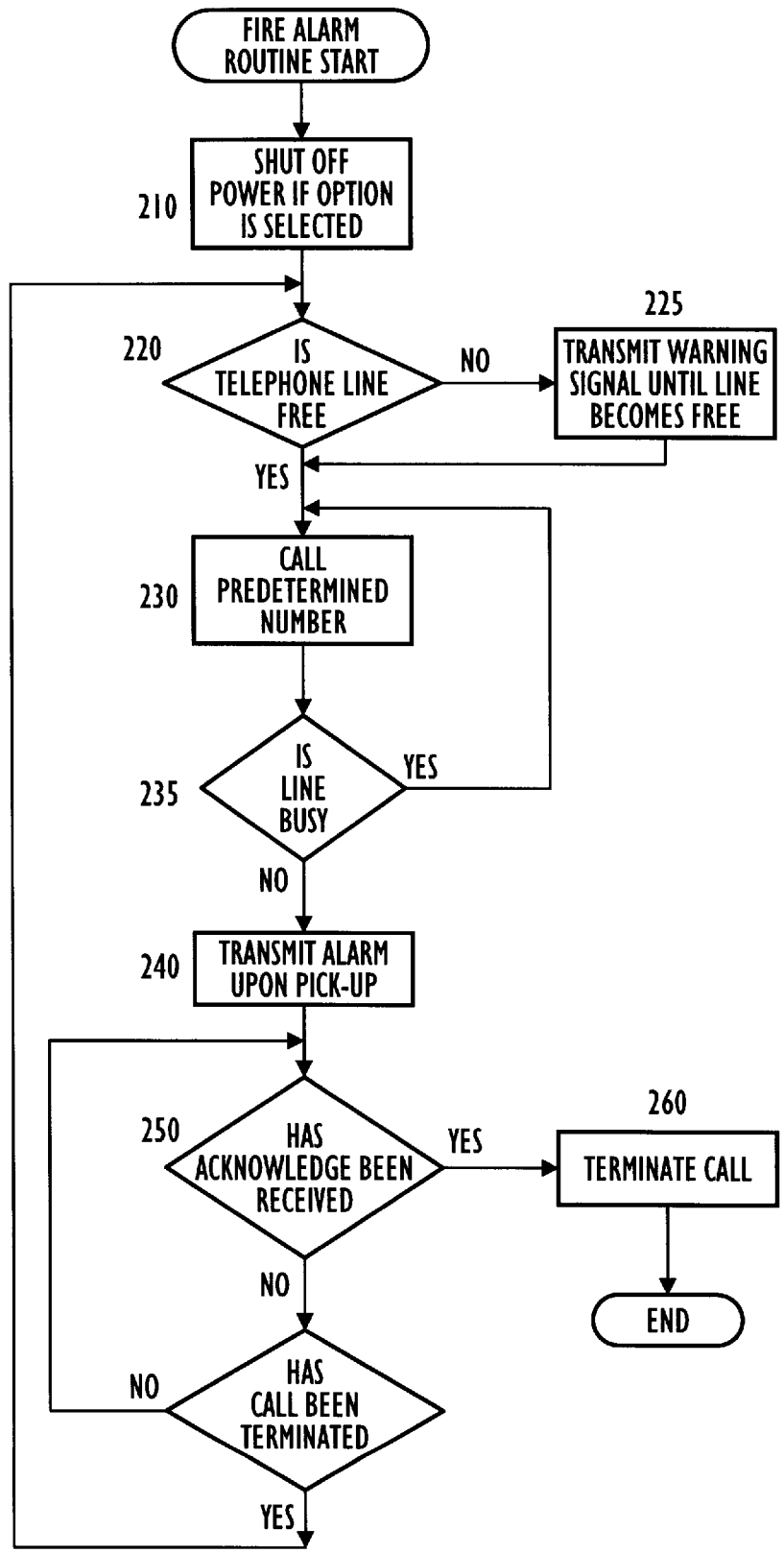
FIG. 4 is a flow chart of the fire alarm routine in accordance with an embodiment of the present invention.

Referring now to FIG. 4, the fire alarm routine is discussed. When fire detector circuit 70 detects a fire it sends a signal to microprocessor 50 over line 53 to cause microprocessor 50 to enter the fire alarm routine. Microprocessor 50 may be programmed with an option to turn off the power supplied to the unit in the event of a fire. If the controller is so equipped, in stage 210, the power controller determines if the option to shut power off in the event of a fire has been preselected and shuts power off to the unit if it has been preselected. The power controller then moves to stage 220. Stages 220–270 function identically to stages 120–170 in FIG. 3, with the possible exception that the fire alarm signal to be transmitted over the phone lines by the power controller in stage 240 may be a different signal than the power-off alarm signal that is transmitted in stage 140 of FIG. 3.

Figure 5:
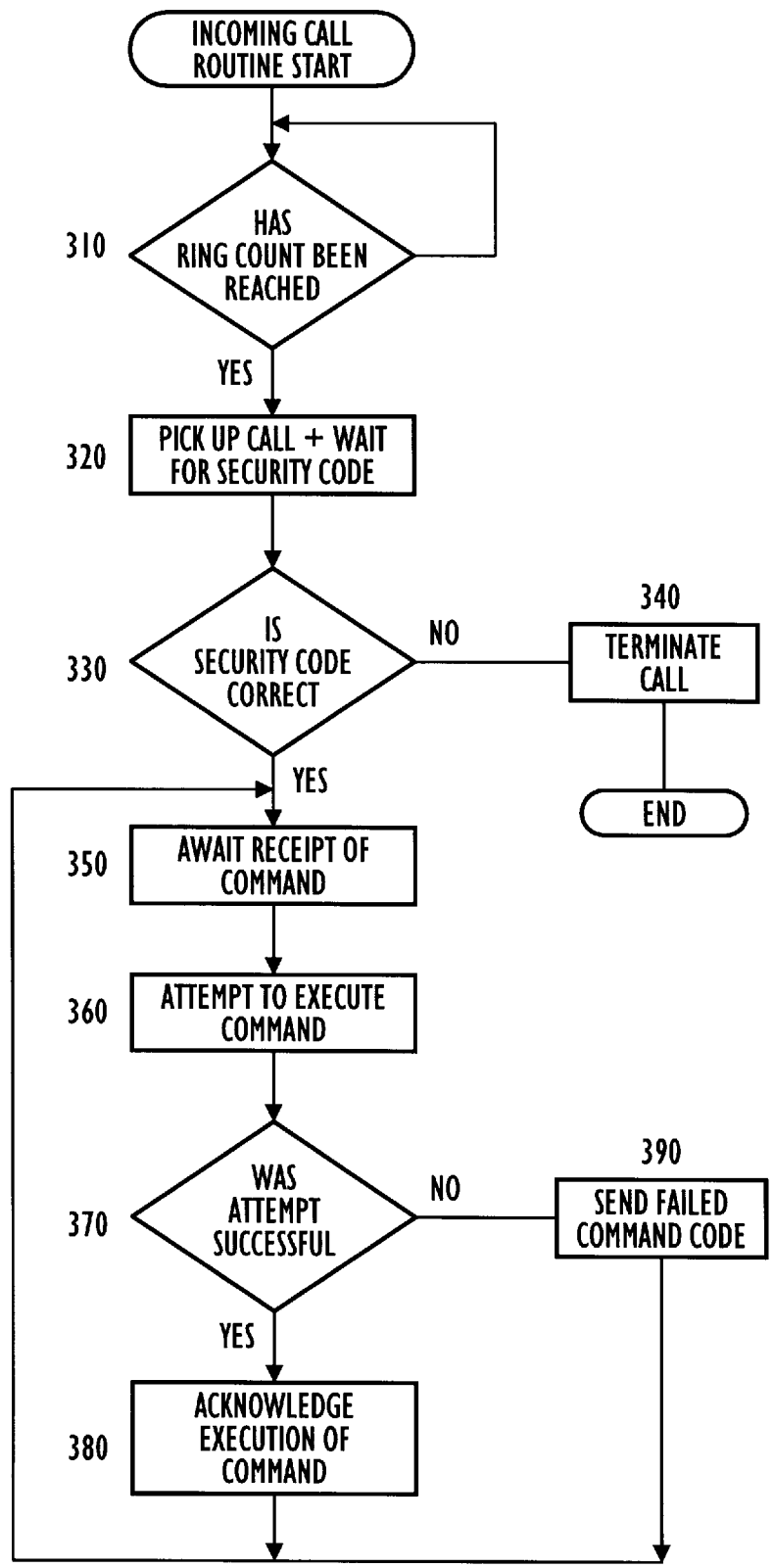
FIG. 5 is a flow chart of the incoming call routine in accordance with an embodiment of the present invention.

The incoming call routine in FIG. 5 will now be discussed. When the power controller receives an incoming phone call it enters the incoming call routine. The ring count is monitored in stage 310. Once the ring count reaches the predetermined pick-up ring count then the power controller picks up the call in stage 320. In stage 330, the power controller determines if the security code has been entered. If the correct code has not been entered the power controller terminates the call in stage 340 and the routine ends. It should be understood that the present invention need not terminate the call upon one incorrect attempt at entering the security code. Any number of attempts could be utilized in accordance with the present invention.

If the correct security code is received, the controller awaits receipt of a command in stage 350. Such commands may include: disable power, which may be used, for example, by a hotel front desk clerk to turn off a room's heating/air conditioning unit upon check-out; enable power, which may be used, for example, by a hotel front desk clerk to turn on a room's heating/air conditioning unit upon check-in; set pick-up ring count, which may be used, for example, by a hotel front desk clerk to minimize the number of rings a controller will wait prior to picking-up the call when a room is unoccupied and to maximize that number when a room is occupied; set new security code, which may be utilized to change the security code; set length of power-on delay, which may be utilized to change the length of time a controller denies a unit power once normal power has been restored; set new call-back number, which may be used to change the number the controller calls when an alarm is to be transmitted; alarm acknowledge, which may be used to acknowledge that an alarm has been received by, for example, a hotel front desk clerk; and the like.

Once the command is received, the controller attempts to execute the command in stage 360. In stage 370, the controller determines if the command was in fact successfully executed. If it was, in stage 380, the controller sends the caller back an acknowledge signal that the command has been executed. If it was not successfully executed, in stage 390, the controller sends the caller back a failed command signal. The acknowledge signal and the failed command signal may be a tone or series of tones or any number of beeps. The controller then returns to stage 360 and awaits another command. If at any time during the routine, the call is terminated, the power controller exits the routine One skilled in the art will know that variations on the above disclosed embodiment may be made. For instance, the phone lines may be replaced by fiber optics. The present invention is not limited to the embodiment described herein.

We claim:

1. A power control apparatus for controlling power from a power source to a power device comprising:

a modular structure;

power input means, disposed in the modular structure, for receiving power from the power source;

power output means, disposed in the modular structure, for outputting power directly to a power conductor of the power device; and power control means, disposed in the modular structure, for monitoring a parameter of the received power from the power input means, removing the output power from the power output means when the parameter falls outside a predetermined range, and reapplying the output power to the power output means after measuring a predetermined event.

2. The power control apparatus of claim 1, wherein:

the parameter is a voltage level.

3. The power control apparatus of claim 1, wherein:

the power control apparatus is connected to the power device only through the power output means.

4. The power control apparatus of claim 1, further comprising:

communications means for transmitting telephonic signals in response to signals from the power control means, and receiving telephonic signals.

5. The power control apparatus of claim 4, wherein:

the communications means includes at least one of a standard telephone socket or standard telephone plug, for connecting the communications means to a telephonic network.

6. The power control apparatus of claim 4, wherein:

the communications means calls a predetermined telephone number and transmits a telephonic alarm signal upon pick-up of the call when the power control means detects that the parameter falls outside the predetermined range.

7. The power control apparatus of claim 4, wherein:

the communications means includes at least one of a standard telephone socket or standard telephone plug, for connecting the communications means to a telephone.

8. The power control apparatus of claim 6, wherein:

the communications means continues to call the predetermined telephone number and transmit the telephonic alarm signal until the communications means receives a telephonic alarm acknowledge signal.

9. The power control apparatus of claim 1, wherein:

the predetermined event is a predetermined period of time.

10. The power control apparatus of claim 1, further comprising:

fire detector means for detecting a fire.

11. The power control apparatus of claim 10, wherein: the fire detector means comprises a microphone.

12. The power control apparatus of claim 10, wherein:

the power control means removes the output power from the power output means when the fire detector means detects a fire.

13. The power control apparatus of claim 10, further comprising:

communications means for calling a predetermined telephone number and transmitting a telephonic alarm signal upon pick-up of the call when the fire detector means detects a fire.

14. The power control apparatus of claim 10, wherein:

the power control means includes a microphone operable to detect an audible alarm from a smoke detector.

15. The power control apparatus of claim 13, wherein:

the communications means continues to call the predetermined telephone number and transmit the telephonic alarm signal until the communications means receives a telephonic alarm acknowledge signal.

16. The power control apparatus of claim 1, wherein:
the power input means includes a standard electrical plug for connecting the power input means to a socket of the power source.

17. The power control apparatus of claim 4, wherein:
the received telephonic signals comprise at least one command to be executed by the power control apparatus.

18. The power control apparatus of claim 17, wherein:
the at least one command is at least one predetermined tone.

19. The power control apparatus of claim 17, wherein:
the power control means will not execute the at least one command prior to the communications means receiving a telephonic security code.

20. The power control apparatus of claim 17, wherein:
the at least one command includes a command to restore the output power.

21. The power control apparatus of claim 17, wherein:
the at least one command includes a command to remove the output power.

22. The power control apparatus of claim 17, wherein:
the at least one command includes a command to set a count of rings on which the power control apparatus is to pick-up an incoming telephone call.

23. The power control apparatus of claim 17, wherein:
the at least one command includes a command to set a new security code.

24. The power control apparatus of claim 17, wherein:
the at least one command includes a command to set a new predetermined telephone number for the power control apparatus to call to report an alarm.

25. The power control apparatus of claim 17, wherein:
the communications means transmits a telephonic acknowledge signal upon the power control apparatus successfully completing a received command.

26. The power control apparatus of claim 25, wherein:
the telephonic acknowledge signal is a predetermined number of beeps.

27. The power control apparatus of claim 17, wherein:
the communications means transmits a telephonic failure signal upon the power control apparatus being unsuccessful in an attempt to complete a received command.

28. The power control apparatus of claim 27, wherein:
the telephonic failure signal is a predetermined number of beeps.

29. The power control apparatus of claim 1, wherein:
the power output means includes a standard electrical socket for connecting the power output means to a plug of the power device.

30. The power control apparatus of claim 29, wherein:
the power output means further comprises another socket for connecting the power output means to another power device.

31. The power control apparatus of claim 1, wherein:
the power device includes a compressor.

32. The power control apparatus of claim 1, wherein:
the power device is an air conditioning unit.

33. A power control apparatus that controls power from a power source to a power device, comprising:
a modular structure;
a power input, disposed within the modular structure, to receive power from the power source;
a power output, disposed within the modular structure, to output power directly to a power conductor of the power device;
a power control circuit, disposed within the modular structure, to monitor a parameter of the received power and output a parameter problem signal when the parameter falls outside a predetermined range; and
a microprocessor, disposed within the modular structure, to receive the parameter problem signal from the power control circuit, wherein, upon receiving the parameter problem signal, the microprocessor removes power from the power output and reapplies power to the power output when a predetermined event is measured.

34. The power control apparatus of claim 33, further comprising:
a telephone transceiver to transmit telephonic signals to a telephone network;
wherein, upon receiving the parameter problem signal, the microprocessor sends an alarm signal to the transceiver for telephonic transmission.

35. The power control apparatus of claim 34, wherein:
the transceiver calls a predetermined telephone number and transmits a telephonic alarm signal upon pick-up of the call.

36. The power control apparatus of claim 35, wherein:
the transceiver continues to call the predetermined telephone number until the transceiver receives a telephonic alarm acknowledge signal.

37. The power control apparatus of claim 33, further comprising:
a fire sensor;
wherein, upon the fire sensor sensing a fire, the microprocessor removes power from the power output.

38. The power control apparatus of claim 32, further comprising:
a fire sensor;
wherein the transceiver calls a predetermined telephone number and transmits a telephonic alarm signal upon pick-up of the call when the fire sensor senses a fire.

39. The power control apparatus of claim 38, wherein:
the fire sensor is a microphone capable of sensing an audible smoke alarm.

40. The power control apparatus of claim 38, wherein:
the transceiver continues to call the predetermined telephone number and transmit the telephonic alarm signal until the transceiver receives a telephonic alarm acknowledge signal.

41. The power control apparatus of claim 34, further comprising:
a telephone connector to connect the transceiver to the telephone network, wherein the telephone connector comprises at least one of a standard telephone socket or standard telephone plug.

42. The power control apparatus of claim 34, further comprising:
a telephone connector to connect the telephone network to a telephone, wherein the telephone connector is at least one of a standard telephone socket or standard telephone plug.

43. The power control apparatus of claim 33, wherein:
the power control apparatus is connected to the power device only through the power output.

44. The power control apparatus of claim 33, wherein:
the parameter is a current level.

45. A heating/air conditioning system comprising:

a heating/air conditioning unit;

a modular structure separate from the heating/air conditioning unit;

a power input, disposed in the modular structure, to receive power from a power source;

a power output, disposed in the modular structure, to output power directly to a power conductor of the heating/air conditioning unit;

a power control circuit, disposed in the modular structure, to monitor a parameter of the received power and output a parameter problem signal when the parameter falls outside a predetermined range;

a microprocessor, disposed in the modular structure, to receive the parameter problem signal from the power control circuit, wherein, upon receiving the parameter problem signal, the microprocessor removes power from the power output and reapplies power to the power output after a predetermined event is measured.

46. The system of claim 45, wherein:

the parameter is a voltage level.

47. The system of claim 45, wherein:

the transceiver calls a predetermined telephone number and transmits a telephonic alarm signal upon pick-up of the call.

48. The power control apparatus of claim 45, wherein:

the power input includes a standard electrical plug that can connect to a socket of the power source.

49. The system of claim 47, wherein:

the transceiver continues to call the predetermined telephone number until the transceiver receives a telephonic alarm acknowledge signal.

50. The system of claim 45, further comprising:

a fire sensor;

wherein, upon the fire sensor sensing a fire, the microprocessor removes power from the power output.

51. The power control apparatus of claim 50, wherein:

the fire sensor is a microphone capable of sensing an audible smoke alarm.

52. The system of claim 45, further comprising:

a telephone transceiver to transmit telephonic signals to a telephone network;

wherein, upon receiving the parameter problem signal, the microprocessor sends an alarm signal to the transceiver for telephonic transmission.

53. The system of claim 52, further comprising:

a fire sensor;

wherein the transceiver calls a predetermined telephone number and transmits a telephonic alarm signal upon pick-up of the call when the microphone senses an audible smoke alarm.

54. The system of claim 53, wherein:

the transceiver continues to call the predetermined telephone number and transmit the telephonic alarm signal until the transceiver receives a telephonic alarm acknowledge signal.

55. The power control apparatus of claim 53, wherein:

the fire sensor is a microphone capable of sensing an audible smoke alarm.

56. The power control apparatus of claim 52, further comprising:

a telephone connector to connect the transceiver to the telephone network, wherein the telephone connector comprises at least one of a standard telephone socket or standard telephone plug.

57. The power control apparatus of claim 52, further comprising:

a telephone connector to connect the telephone network to a telephone, wherein the telephone connector is at least one of a standard telephone socket or standard telephone plug.

58. The system of claim 45, wherein:

the predetermined event is a predetermined period of time.

59. The power control apparatus of claim 45, wherein:

the power output includes a standard electrical socket for connecting the power output means to a plug of the power device.

60. The system of claim 45, wherein:

the power control apparatus is connected to the power device only through the power output.

61. A modular power control apparatus that controls power from a power source to a power device, comprising:

a power input to receive power from the power source;

a power output to output power to a power conductor of the power device;

a power control circuit to monitor a parameter of the received power and output a parameter problem signal when the parameter falls outside a predetermined range; and a microprocessor to receive the parameter problem signal from the power control circuit, wherein, upon receiving the parameter problem signal, the microprocessor removes power from the power output and reapplies power to the power output after a predetermined event is measured.

62. The power control apparatus of claim 61, further comprising:

a telephone transceiver to transmit telephonic signals to a telephone network;

wherein, upon receiving the parameter problem signal, the microprocessor sends an alarm signal to the transceiver for telephonic transmission.

63. The power control apparatus of claim 61, wherein:

the power input includes a standard electrical plug that can connect to a socket of the power source.

64. The power control apparatus of claim 61, further comprising:

a fire sensor;

wherein, upon the fire sensor sensing a fire, the microprocessor removes power from the power output.

65. The power control apparatus of claim 64, wherein:

the fire sensor is a microphone capable of sensing an audible smoke alarm.

66. The power control apparatus of claim 61, wherein:

the power output includes a standard electrical socket for connecting the power output means to a plug of the power device.

67. The power control apparatus of claim 61, wherein:

the power device includes a compressor.

68. The power control apparatus of claim 61, wherein:

the power device is an individual air conditioning unit.

69. The power control apparatus of claim 61, wherein:

the predetermined event is a predetermined period of time.

70. The power control apparatus of claim 61, wherein:

the power control apparatus is connected to the power device only through the power output.

71. A method for controlling power from a power source to a power device, comprising:
- connecting a power input to receive power from the power source;
- connecting a power output to output power directly to a power conductor of the power device;
- monitoring a parameter of the power from the power source;
- removing the power output to the power conductor when the parameter falls outside a predetermined range; and
- reapplying the power output to the power conductor after measuring a predetermined event;
- wherein the power input and the power output are disposed in a modular structure, and the monitoring, the removing and the reapplying are performed within the modular structure.

72. The method of claim 71, wherein:
the parameter is a voltage level.

73. The method of claim 71, further comprising:
transmitting telephonic signals in response to the monitoring.

74. The method of claim 73, wherein:
the transmitting includes
- calling a predetermined telephone number, and
- transmitting an alarm signal when the parameter falls outside the predetermined range.

75. The method of claim 73, wherein:
the transmitting includes transmitting the telephonic signals using at least one of (a) a standard telephone socket disposed in the modular structure or (b) a standard telephone plug disposed in the modular structure.

76. The method of claim 71, further comprising:
receiving telephonic signals; and
in response to the telephonic signals, performing one of (a) removing the power output to the power conductor or (b) reapplying the power output to the power conductor.

77. The method of claim 71, further comprising:
removing the power output to the power conductor when a fire is detected.

78. The method of claim 71, further comprising:
transmitting a telephonic alarm signal upon detecting a fire.

79. The method of claim 71, wherein:
the power device is an air conditioner.

80. The method of claim 71, wherein:
the predetermined event is a predetermined period of time.

81. The method of claim 71, wherein:
the power input includes one of (a) a standard electrical plug or (b) a standard electrical socket.

* * * * *